US005692725A

United States Patent [19]
Fehringer

[11] Patent Number: 5,692,725
[45] Date of Patent: Dec. 2, 1997

[54] VALVE SEAL

[75] Inventor: Hans-Jürgen Fehringer, Bochum, Germany

[73] Assignee: Adams GmbH & Co. Armaturen KG, Herne, Germany

[21] Appl. No.: 657,881

[22] Filed: May 31, 1996

[30] Foreign Application Priority Data

Jun. 21, 1995 [DE] Germany ............... 195 22 474.4

[51] Int. Cl.$^6$ ........................................ F16K 1/22
[52] U.S. Cl. ............................... 251/306; 251/360
[58] Field of Search .......................... 251/305, 306, 251/360; 137/315

[56] References Cited

U.S. PATENT DOCUMENTS 5,377,954  1/1995  Adams et al. ................ 251/306

*Primary Examiner*—John Fox
*Attorney, Agent, or Firm*—Townsend and Townsend and Crew

[57] ABSTRACT

A butterfly valve has a disc which is pivotally mounted inside the passage through the housing and movable between open and closed positions. In its closed position, a seal is established between the valve housing and the disc with a seal ring that has a flat portion clamped to the housing with an axially movable pressure ring and an inwardly extending, resilient seal ring portion that engages a conical periphery of the disc. A plurality of threaded, circumferentially spaced-apart locking bolts in a segmented retainer ring attached to the valve housing are tightened against the pressure ring to secure the seal ring to the housing. The locking bolts are disposed in through holes in the support ring. Each through hole includes a threaded portion, which is contiguous with the side of the support ring facing the pressure ring, and an unthreaded section which terminates at the outer side of the pressure ring. The ends of the bolts disposed in the threaded portion of the through holes and facing away from the pressure ring have Allen-head (or the like) recesses so that they can be tightened with an Allen-head wrench (or the like) extending through the unthreaded section of the holes. A locking bolt which becomes loose over time cannot unthread itself past the unthreaded section of the through hole and, therefore, cannot accidentally fall into the medium flow through the valve. If needed, a set screw can be used to prevent an accidental loosening of the locking bolt. The set screw has a through opening of a sufficient cross-section so that the Allen-head wrench can pass through it. The through bore of the counter screw further has a cross-section so that it too can be engaged and tightened with a wrench. Like the locking bolt, the unthreaded section of the through hole prevents the set screw from dropping into the medium flow through the valve.

14 Claims, 1 Drawing Sheet

VALVE SEAL

BACKGROUND OF THE INVENTION

The present invention relates to valve seals, particularly seals for butterfly valves having discs which are pivotally moved into and out of their closed positions.

Butterfly valves with metal seals are widely used in pipelines for high temperature liquid and gaseous media, for example in hot water or steam pipelines, pipelines used in industrial processes, and the like. Such valves employ seals constructed of at least two metal seal rings which have sealing surfaces that cooperate with and seal against a valve seat or seating surface defined by either the valve housing or the valve disc, depending on whether the seal rings are mounted on the valve disc or housing, respectively. The seal rings are secured and tightened to the housing (or alternatively to the disc) with a relatively large number of threaded bolts each of which is disposed in a bore formed in a holding or retainer ring and oriented parallel to the axis of the valve. To prevent a loosening of the bolts, a threaded set or counter screw is tightened against the back side of the threaded bolts; that is, the side opposite the seal rings. Such a valve seat construction is disclosed and claimed in U.S. Pat. No. 5,377,954, the disclosure of which is incorporated herein by reference.

The seal disclosed and claimed in this patent has been very effective and successful. During use, as a result of vibrations, for example, one or more of the many threaded bolts, and in particular the set screws, can become loose over time, might become disengaged from the threaded bore, and might drop into the pipeline. This is generally undesirable. When, for example, the valve is part of a pipeline leading to a turbine, a loose screw or bolt entrained in the flow to the turbine can cause serious damage to the turbine and lead to down times. This can be costly, both in terms of required turbine repairs and losses due to lost production.

SUMMARY OF THE INVENTION

The present invention prevents that loosened mounting bolts for such seal rings and/or the set screws for them can drop into the medium flow through the valve.

It is therefore an object of the present invention to provide means for positively preventing bolts and screws, which may become loose during the operation of the valve, from dropping into the medium flow through the valve. This is achieved by placing a retainer ring which overlies a portion of the seal ring, anchoring the retainer ring to the valve housing, and using locking bolts which hold the seal ring in place. The retainer ring has a smooth through hole for each locking bolt and threading the holes from the side of the ring facing the seal rings over only part of its length. As a result, a section of the smooth, unthreaded through hole terminates at the opposite side of the support ring; that is, the side facing away from the seal ring. The unthreaded section of the through hole therefore has a reduced cross-section part which the threaded locking bolt cannot move.

Prior to the installation of the support ring, the locking bolts are threaded into the threaded bores from the side of the support ring facing the seal rings. The ends of the locking bolts facing away from the seal ring have a recess for engaging them with a tightening tool, e.g. they have an Allen-head recess or a transverse slit for tightening the bolts by extending an Allen-head wrench, or a screwdriver, through the unthreaded sections of the through holes and from the side of the support ring facing away from the seal ring.

Thus, the present invention positively prevents loosened bolts from accidentally dropping into the medium flow through the valve in a simple and inexpensive manner by blocking movement of the bolt past the reduced diameter section of the hole. As a result, it will often be feasible to delete the use of set screws, thereby advantageously reducing the number of parts for the seal of the valve. Since larger valves may have a hundred or more locking bolts for securing the seal ring in place, significant savings in terms of both parts and assembly labor can be achieved.

If it is nevertheless desirable or required to provide set screws, the present invention also positively prevents them from dropping into the medium flow through the valve should one or more of the set screws loosen itself over time during the operation of the valve. This is achieved in accordance with the present invention by first threading the set screws into the threaded portion of the through holes from the side of the support ring facing the seal ring. The set screw is ring-shaped, is threaded on its periphery, and has an axial opening of a cross-section that can be engaged by a tightening tool, e.g. an Allen-head wrench. The axial opening through the set screw has a sufficiently large cross-section so that the tool for tightening the lock bolt can extend axially through the opening. Following the insertion of the set screw, the locking bolt is threaded into the through bore of the retainer ring, as was described above.

Following the assembly of the retainer ring, the set screws and the locking bolts, the ring is installed in the valve and the locking bolts are tightened against the seal ring by extending the tightening tool through the opening in the axial locking bolts. Following the tightening of the locking bolts against the seal ring, the set screws are tightened against the locking bolts by engaging them with an appropriate tool, e.g. an Allen-head wrench.

DESCRIPTION OF THE PREFERRED EMBODIMENTS

Figure 1:
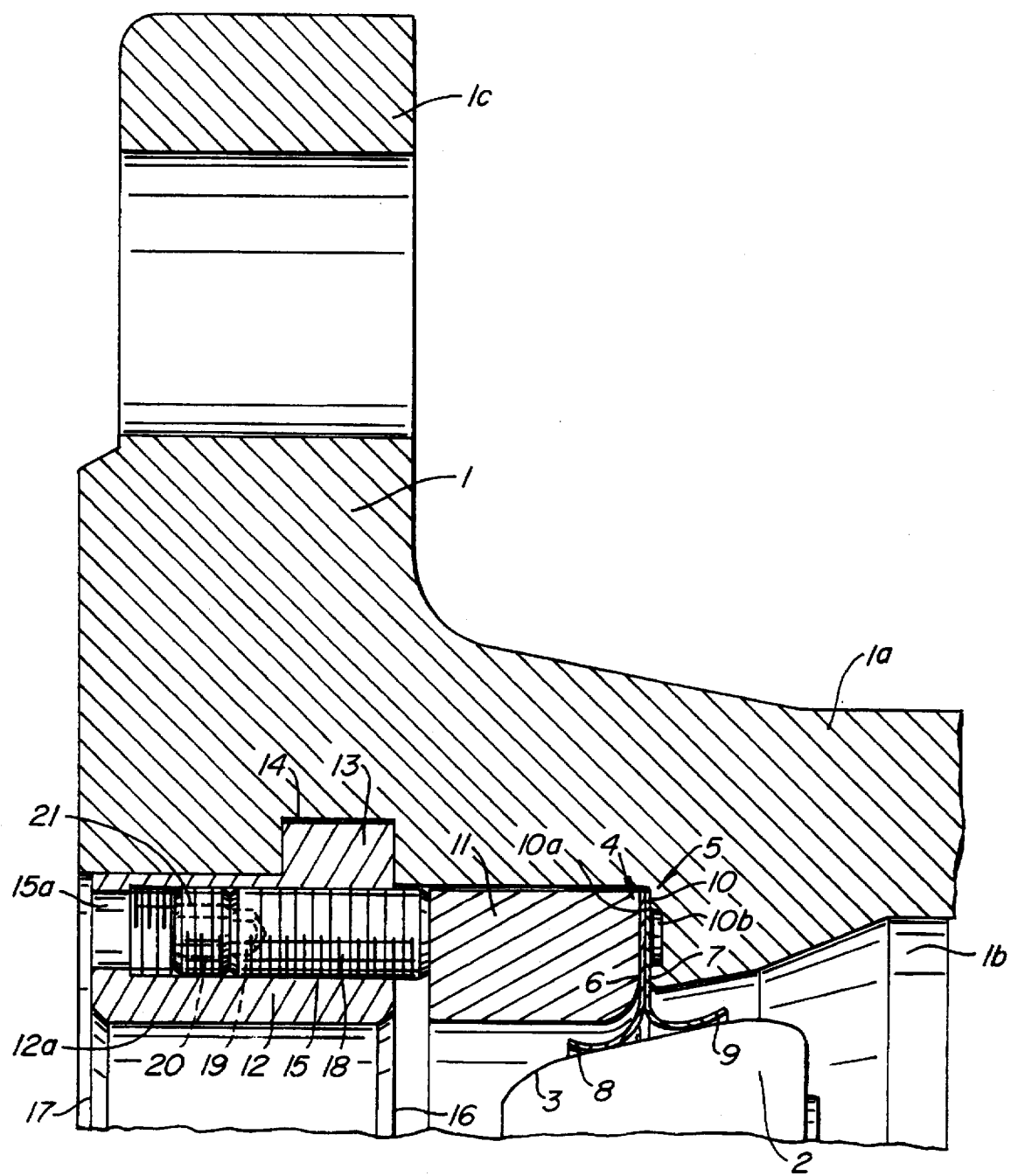
FIG. 1 is a fragmentary, side elevational view, in section, through the portion of a butterfly valve in the vicinity of its sealing arrangement and illustrates the manner in which the seal ring is secured to the valve in accordance with the present invention.

Referring to FIG. 1, a butterfly valve housing 1 has a main body 1a, a valve passage 1b through which a medium flows in an axial direction of the housing, and a flange 1c with which the valve is secured to an opposite component (not shown) of a pipeline or other conduit in which the valve is installed. A valve disc 2 is pivotally mounted to the housing and disposed inside passage 1b. The disc can be pivoted from its closed position, shown in the drawing, to its open position (not shown) by pivoting it in a counterclockwise direction as seen in FIG. 1. The periphery of the disc has a conical shape and defines a rigid seating surface 3 for establishing a seal when the disc is in its closed position. The construction and mounting of the disc is disclosed in U.S. Pat. No. 3,442,488, the disclosure of which is incorporated herein by reference.

The seal includes first and second seal rings 4, 5 which are mounted to valve housing 1. The seal rings have flat ring portions 6, 7, respectively, and arcuate seal ring lips 8, 9, respectively. The latter depend radially inwardly from the flat ring sections and curve in opposite directions away from each other. The radially outermost peripheries of the flat seal ring portions are welded together, as is described in greater detail in the above-referenced U.S. Pat. No. 5,377,954.

An annular recess 10 is formed in body 1a of the housing and forms a seal ring mounting surface 10a which faces in an axial direction. The flat seal ring portions 6, 7 are pressed against the mounting surface with a pressure ring 11. To prevent leakage past the seal ring, a flat gasket 10b is preferably provided. When the pressure ring is tightened, as is further described below, the flat seal ring portions are rigidly clamped to the main body of the housing. The arcuate seal ring lips project radially inwardly therefrom and they can be resiliently compressed outwardly relative to their respective flat ring portions so that, upon closing disc 2, they engage the conical seat 3 of the disc. The pressure exerted by the lips due to their resilient deformation, together with additional pressure generated by the medium on one or the other side of the closed disc, establishes a tight seal between the seal rings and the disc.

Pressure ring 11 is firmly tightened against seal rings 4, 5 supported by mounting surface 10a with a mounting arrangement employing a plurality of threaded bolts 18. The arrangement includes a segmented retainer ring 12, an interior surface 12a of which defines a portion of the passage through the valve and which has a radially outwardly extending flange 13 of a rectangular cross-section disposed in a correspondingly shaped, radially inwardly open groove 14 in valve body 1a. Flange 13 and groove 14 have tight tolerances made so that each segment (typically three) which together define support ring 12 can be pushed radially outwardly until the flanges fully nest in the grooves. Once fully nested, axial forces can be applied to the ring which are transmitted via flange 13 to housing body 1a.

Retainer ring 12 has a multiplicity of through holes 15 which are parallel to the axis of valve passage 1b. A portion of each through bore extending from an inner side 16 (which faces disc 2) towards an opposite, outer side 17 of the retainer ring (which faces away from the disc), but which terminates short of the outer side, is threaded. As a result, an outer section 15a of each hole is unthreaded and has a diameter which is less than the outermost diameter of the threaded part of the hole.

A threaded bolt 18 is disposed in each through hole 15 of the retainer ring. The end of each threaded bolt facing towards the outer side 17 of the support ring has a recess 19 for engaging it with a tightening tool. In the preferred embodiment of the invention, the recess is an Allen-head recess so that the bolt can be engaged and turned with an Allen-head wrench (not shown). Prior to the installation of retainer ring 12, each bolt 18 is threaded into the associated through hole 15 from the end thereof terminating at inner side 16 of the retainer ring by extending the wrench from outer side 17 of the ring through the unthreaded section 15a of the hole.

To assemble the valve, seal rings 4, 5 are first placed into annular recess 10 in valve body 1a, followed by the insertion of pressure ring 11. The individual segments of retainer ring 12 are then installed by engaging the outer flange ring 13 with groove 14. Thereafter the seal ring locking bolts 18 are turned with a wrench extending through the unthreaded outer portions 15a of the through holes until the bolts engage and urge pressure ring 11 against seal rings 4, 5 and press the seal ring against mounting surface 10a of the housing. The locking bolts are tightened with the required torque and thereby lock the seal ring, via pressure ring 11, in place. Friction between the threads of the locking bolts and the threaded bores prevents a loosening of the bolts. If, during operation of the valve, a locking bolt nevertheless comes loose over time, it remains captured inside through hole 15 and, therefore, cannot drop into or become entrained in the medium flow through the valve because the unthreaded section 15a of the through bores makes it impossible for the loosened bolt to move past it because its outermost diameter is larger than the diameter of the unthreaded hole section.

If it is desired to positively secure locking bolts 18 once they have been tightened to the desired torque against pressure ring 11, and therewith against seal rings 4, 5, set screws 20 are provided. Each set screw has a lesser axial length than locking bolt 18 and includes an axial opening 21 which extends over the entire length of the set screw and has a cross-section so that it can be engaged with a wrench, e.g. an Allen-head wrench. Further, the axial opening 21 through the set screw has a cross-section which is preferably larger and at least not smaller than the cross-section of recess 19 in locking bolt 18 so that the wrench for turning the locking bolt can be extended through the axial opening in the set screw. The set screw is tightened against the locking bolt after the latter has been tightened to the desired torque. The set screws are installed by threading them into the respective through holes 15 first. The locking bolts are then threaded into the corresponding through holes 15 before the retainer ring 12 segments are installed in the valve housing. Should, during the operation of the valve, one or more of the set screws 20 become loose, they too are captured inside the threaded through holes and are prevented from becoming entrained in the medium flow through the valve because they cannot pass the unthreaded outer sections 15a of the through holes.

It was recognized in the past that tightened seal ring locking bolts could become loose over time. To decrease the likelihood thereof, a deforming punch mark was sometimes made into the threads of each bolt and the through bore after the locking bolt has been fully tightened. This not only entailed additional assembly work and costs, it also has the considerable disadvantage that it greatly complicated maintenance and repair since it was difficult to undo the punch mark, which could lead to undesirable damage. The present invention eliminates the need for such complicated and therefore undesirable ways of securing the tightened locking bolt in place.

What is claimed is:

1. An arrangement for securing a seal ring to a member of a valve having an axial passage for flowing a fluid medium through the valve, the arrangement comprising a seal ring having an annular portion for abutment against a support surface of the valve; a retainer ring formed to overlie the annular portion of the seal ring and including a multiplicity of through holes which are located so that they overlie the annular portion of the seal ring, each through hole extending over a width of the retainer ring and having a first threaded hole part extending from the surface of the retainer ring facing the seal ring towards a second surface of the retainer ring facing away from the seal ring, the threaded part of the through hole having a length less than the width of the retainer ring, and a reduced diameter hole section extending from an inner end of the threaded hole part to the outer surface of the retainer ring; means for securing the retainer ring to the valve; and a seal ring locking bolt disposed in each threaded through hole part, ends of the locking bolts facing away from the sealing ring including means for engaging the locking bolts with a locking bolt turning tool by extending the turning tool through the reduced diameter through hole section; whereby locking bolts which accidentally become loose during use of the valve are prevented from dropping into the medium flow through the valve passage if they become loosened during use of the valve.

2. An arrangement according to claim 1 including a pressure ring disposed between the seal ring and the side of the retainer ring facing the seal ring, and wherein the locking bolts engage the pressure ring and urge it against the annular portion of the seal ring.

3. An arrangement according to claim 1 wherein the means for securing the retainer ring to the valve comprises a flange projecting in a generally radial direction from the retainer ring and adapted to tightly engage a correspondingly shaped, radially oriented groove in the valve.

4. An arrangement according to claim 1 including a set screw disposed in the through holes between the reduced diameter section thereof and an end of the locking bolt, the set screw including a through bore formed to provide access for the turning tool from the outer surface of the retainer ring past the set screw into engagement with the engaging means on the locking bolt.

5. An arrangement according to claim 4 wherein the set screw includes means for turning it with a turning tool by extending the turning tool from the outer surface of the retainer ring through the reduced diameter through hole section and into engagement with the turning means of the set screw.

6. An arrangement according to claim 1 wherein the valve includes a housing and disc pivotally mounted to the housing, and wherein the seal ring and the retainer ring are mounted to the housing.

7. An arrangement according to claim 1 wherein the valve includes a housing and a disc pivotally mounted to the housing, and wherein the seal ring and the retainer ring are mounted to the disc.

8. A valve comprising a housing defining a fluid passage therethrough; a closure member movably mounted to the housing and movable between an open position permitting the flow of fluid through the housing and a closed position preventing fluid flow through the housing; a seat on one of the housing and the closure member and a cooperating seal ring on the other one of the housing and the closure member, the seat and the seal ring being arranged to establish a substantially leakproof seal when the closure member is in its closed position, the seal ring including an annular portion for clamping it against a surface defined by the one of the housing and the closure member to which the seal ring is secured; and a seal ring retainer carried by the one of the housing and the closure member to which the seal ring is secured, the retainer including a retainer ring shaped to substantially overlie the annular portion of the seal ring, a multiplicity of spaced-apart holes extending from an inner side of the retainer ring facing the seal ring to an outer side of the retainer ring facing away from the seal ring, each through hole having a threaded part extending from the inner side of the ring towards the outer side and merging with a reduced diameter hole section extending from an inner end of the threaded part to the outer side of the retainer ring, and a threaded seal ring locking bolt disposed in each threaded hole part, an outer end of the bolt proximate the outer side of the ring including means for turning the bolt with an instrument extending through the reduced diameter hole section against the annular portion of the seal ring to therewith lock the seal ring in place; whereby locking bolts loosened during operation of the valve are captured by the reduced diameter hole section inside the threaded hole part and are prevented from dropping into the fluid passage of the valve.

9. A valve according to claim 8 wherein the threaded hole part has an outermost diameter defined by thread grooves and an innermost diameter defined by thread peaks in the hole part, and wherein the reduced diameter through hole section has a diameter substantially equal to the innermost diameter of the threaded hole part.

10. A valve according to claim 8 including an annular set screw disposed in the threaded hole part between the outer end of the locking bolt and the reduced diameter hole section, the set screw being shaped so that the turning instrument can extend therethrough.

11. A valve according to claim 8 including a set screw in the threaded hole part between the outer end of the locking bolt and the reduced diameter through hole section, the set screw including first means permitting passage of the instrument for turning the locking screw from the outer side of the retainer ring past the set screw into engagement with the locking bolt and second means for engaging the set screw with a turning tool extending from the outer side of the retainer ring through the reduced diameter hole section into engagement with the second means of the set screw.

12. A valve according to claim 11 wherein the first means comprises a bore extending axially over a length of the set screw and the second means comprises a cross-section of the bore.

13. A valve according to claim 12 wherein the cross-section of the bore is substantially square.

14. A valve according to claim 12 wherein the cross-section of the bore is substantially hexagonal.

* * * * *